United States Patent [19]

Blankenship

[11] 3,925,129
[45] Dec. 9, 1975

[54] TIRE RETREADING SYSTEM

[75] Inventor: James O. Blankenship, Garland, Tex.

[73] Assignee: Long Mile Rubber Company, Dallas, Tex.

[22] Filed: Apr. 19, 1974

[21] Appl. No.: 462,520

[52] U.S. Cl. .................. 156/96; 156/129; 156/394
[51] Int. Cl.² ....................... B29H 5/04; B29H 5/16
[58] Field of Search ............ 156/96, 110, 123, 128, 156/129, 394 FM, 394 R

[56] References Cited
UNITED STATES PATENTS

| | | | |
|---|---|---|---|
| 1,306,602 | 6/1919 | McEwen | 156/96 |
| 2,014,010 | 9/1935 | Wheatley | 156/394 FM |
| 2,282,580 | 5/1942 | Hawkinson | 156/96 |
| 2,468,121 | 4/1949 | Shell | 156/394 FM |
| 2,976,910 | 3/1961 | Nowak | 156/96 |
| 3,728,181 | 4/1973 | Simmons | 156/96 |
| 3,743,564 | 7/1973 | Gross | 156/96 |
| 3,779,833 | 12/1973 | Reppel | 156/96 |

FOREIGN PATENTS OR APPLICATIONS 562,232  1958  Canada................................. 156/96

OTHER PUBLICATIONS
Matri-Chamber Compatible Pre-Cure Retreading System, The Jame C. Heintz Co., Cleveland, Ohio 44111, (Pub. No. and date 72161, 1–73).

*Primary Examiner*—Douglas J. Drummond
*Assistant Examiner*—John E. Kittle
*Attorney, Agent, or Firm*—Richards, Harris & Medlock

[57] ABSTRACT

In a tire retreading system the circumference of a tire body is buffed to a predetermined radius after which a strip of uncured cushion gum rubber and a premolded, precured tread strip are mounted on the tire body. Rigid strips are positioned around the periphery of the mounted tread strip along the outer edges thereof, and a predetermined relationship between the exterior diameter of the mounted tread strip and interior diameters of the rigid strips is established to form a seal in the zone between the tire body and the tread strip having the uncured rubber strip contained therein. The assembly thus formed is mounted in a sealed chamber and is subjected to a heated, pressurized fluid whereby the initially uncured rubber strip is cured to bond the tread strip to the tire body. The rigid strips may comprise various materials such as cloth or synthetic belting, cloth or synthetic webbing, metal bands, etc. and may be either of two piece or one piece construction. The predetermined relationship between the exterior diameter of the mounted tread strip and the interior diameters of the rigid strips may be established either by tightening the rigid strips around the periphery of the mounted tread strip along the outer edges thereof and then pressurizing the interior of the tire body, or by temporarily reducing the exterior diameter of the mounted tread strip, positioning the rigid strips around the exterior periphery of the mounted tread strip along the outer edges thereof, and then allowing the mounted tread strip to return to its original size to the extent permitted by the rigid strips.

27 Claims, 6 Drawing Figures

TIRE RETREADING SYSTEM

FIELD OF THE INVENTION

This invention relates to a tire retreading system, and more particularly to a method of and apparatus for bonding a premolded, precured tread strip to a tire body.

BACKGROUND OF THE INVENTION

Over the years, various tire retreading processes have been proposed. For example, see U.S. Pat. No. 2,014,010 to Wheatley, granted Sept. 10, 1935, and British Pat. No. 746,375 to Kent, published Mar. 14, 1956. A more recent method of tire retreading, together with apparatus for carrying out the method, are disclosed in U.S. Pat. Nos. 3,779,830, 3,779,831, 3,779,832, and 3,779,833, all granted Dec. 18, 1973, to Reppel.

In accordance with the latter process, a tire body is buffed to a predetermined radius, after which a strip of uncured rubber and a precured premolded tread strip are wrapped around the circumference of the tire body. Wicking or venting members are positioned over the tread strip, and a rubber envelope is then fitted around the tread strip and venting members. The tire assembly enclosed in the rubber envelope is then mounted in a sealed chamber. A heated and pressurized fluid is admitted to the chamber whereby the rubber strip is cured to bond the tread strip to the tire body. During the curing operation, the tire body is pressurized such that the pressure within the tire body is greater than the pressure within the chamber. As the initially uncured rubber strip is cured, the rubber envelope prevents the heated and pressurized fluid from entering the space between the tire body and the tread strip. Simultaneously, the venting members allow air to escape from between the tire assembly and the rubber envelope.

Notwithstanding the relatively substantial commercial acceptance that has been achieved by the foregoing process, a number of problems have been encountered in its use. First, the rubber envelope which is employed in the process to prevent the heated and pressurized fluid from entering the space between the tire body and the tread strip is difficult and time consuming to fit over the tire assembly. A related problem involves the fact that if the rubber envelope is not fitted correctly over the tire assembly, leaks can develop which result in a failure of the tread strip to properly bond to the tire body. At the completion of the curing operation, the tire assembly having the rubber envelope mounted thereon is removed from the chamber in a heated condition and is therefore liable to be dropped or otherwise mishandled. This can result in minute leaks in the rubber envelope which are difficult to detect, but which nevertheless can result in failures in subsequent retreading operations. Still another problem involves the fact that the rubber envelope is subject to relatively rapid wear and is expensive to replace. Finally, the rubber envelope acts as a heat shield and therefore tends to substantially increase the time period during which the tire assembly must be heated in order to effect bonding of the tread strip to the tire body.

SUMMARY OF THE INVENTION

The present invention relates to a tire retreading system which overcomes the foregoing and other disadvantages long since associated with the prior art. In accordance with the broader aspects of the invention, substantially rigid strips are positioned on the mounted tread strip along the outer edges thereof, and a predetermined relationship is established between the exterior diameter of the mounted tread strip and the interior diameters of the rigid strips. By this means the rigid strips function to seal the zone between the tire body and the tread strip having the uncured rubber strip or other adhesive layer contained therein. This permits the retreading process to be completed without using a rubber envelope fitted over the entire assembly and thereby eliminates the above-enumerated problems resulting from the use of such a rubber envelope.

In accordance with more specific aspects of the invention, the rigid strips comprise elongate, flexible members which are substantially non-extendable with respect to length. Suitable fasteners are employed for tightening the rigid strips around the mounted tread strip. The strips may comprise natural or synthetic belting materials, natural or synthetic webbing materials, metal bands, etc. and may be either of two piece or of one piece construction. The desired relationship between the exterior diameter of the mounted tread strip and the interior diameters of the rigid strips may be accomplished either by tightening the strips around the mounted tread strip and then pressurizing the interior of the tire body, or by temporarily reducing the exterior diameter of the mounted tread strip, positioning the rigid strips around the periphery of the tread strip, and then allowing the tread strip to resume its normal size to the extent permitted by the rigid strips.

In accordance with still other aspects of the invention, the interior of the tire body is pressurized during the curing of the initially uncured rubber strip or other adhesive layer extending between the tire body and the tread strip. This is accomplished by means of a high temperature inner tube positioned within the tire body and a road rim mounted on the tire body. The tire assembly having the rigid strips mounted thereon is received in a two part matrix chamber having side walls which engage the side walls of the tire body to form a sealed chamber extending entirely around the circumference of the tire body and the tread strip mounted thereon. Curing of the rubber strip or other adhesive layer is carried out by means of a heated, pressurized fluid such as steam which is admitted to the sealed chamber.

DESCRIPTION OF THE DRAWINGS

A more complete understanding of the invention may be had by referring to the following Detailed Description when taken in conjunction with the accompanying Drawings, wherein.

DETAILED DESCRIPTION

Figure 1:
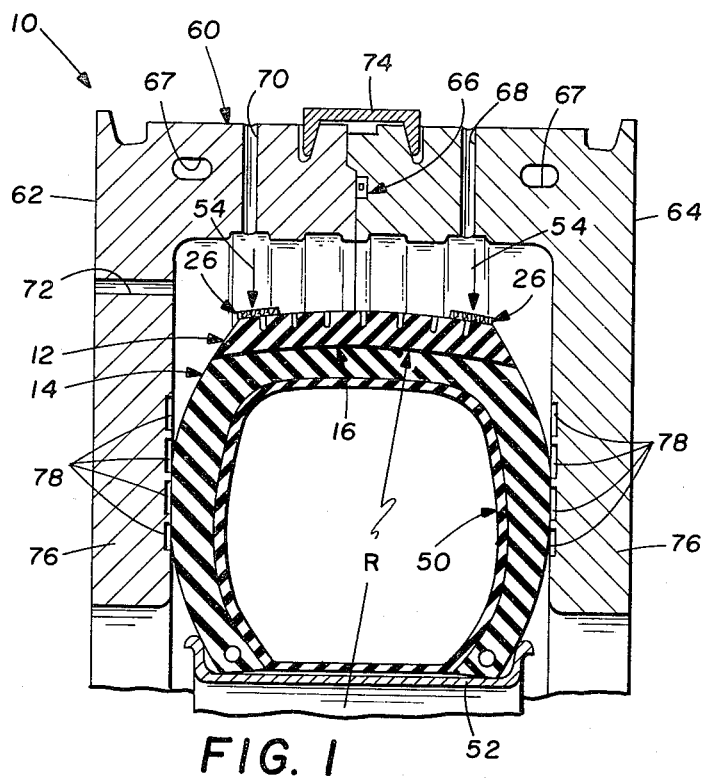
FIG. 1 is a sectional view illustrating a first embodiment of the invention.
Figure 2:
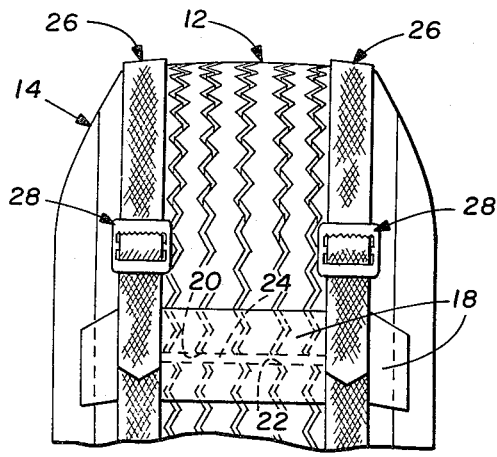
FIG. 2 is a further illustration of the first embodiment.

Referring now to the Drawings, and particularly to FIGS. 1 and 2 thereof, there is shown a tire retreading system 10 incorporating a first embodiment of the invention. The retreading system 10 is utilized to bond premolded, precured tread strips 12 to tire bodies 14 typically by means of an initially uncured cushion gum rubber strip 16 positioned between the circumference of the tire body 14 and the tread strip 12. It will be understood, however, that other thermally activated adhesive materials may be utilized to bond the tread strip 12 to the tire body 14, if desired.

In the use of the tire retreading system 10, the tire body 14 is initially inspected to determine whether it is suitable for retreading. In actual practice, it has been found that tire bodies having any of the following defects should not be retreaded:

1. Damaged or broken beads.
2. Any indication or evidence of having been run overloaded, under-inflated, or flat.
3. Any separation.
4. Excessive oxidation.
5. Cuts or holes in the side walls or crown which will be larger than 1½ inches after skiving.
6. Cracks in the tread grooves which extend to the core.
7. Radial cracks which cannot be removed without exposing body plies.

If the body 14 passes the foregoing inspection, the circumference of the tire body is buffed to a predetermined minimum radius R. For example, in the case of truck tires, a 8.25–20 tire is buffed to a minimum radius R of 17 inches, and a 9.00–20 or larger tire is buffed to a minimum radius R of 19 inches. In addition, the following conditions apply to the buffing operation:

1. If there is not enough rubber remaining on the shoulders of the tire to allow a buffed radius as specified above, the tire should not be retreaded in accordance with the present invention.
2. Any oxidized surface must be removed and all tread designs must be removed from the circumference of the tire body.
3. All nail holes must be properly repaired and inspected.
4. The buffed texture must be reasonably smooth and free from strings. Care should be taken to prevent scorching of the buffed surface.

Following the buffing operation, the tire body is reinspected in accordance with the procedure outlined above. In addition, the circumference of the tire body is checked with a template to assure that it has been buffed to the proper radius R. If for any reason the tire body does not pass the inspection or does not have the proper radius R, it is not accepted for retreading in accordance with the present invention.

Assuming that the tire body 14 passes the second inspection and has the necessary minimum radius R, a layer of cement is applied to the buffed circumference of the tire body. This is preferably accomplished by means of a spraying operation. The tire body is allowed to thoroughly cool prior to the application of the cement, and must be entirely free of any dirt. Also, the cement spraying apparatus should be equipped with a water trap to eliminate any possibility of moisture. The cement is applied to the entire buffed surface of the circumference of the tire body to insure complete coverage. Following the application of the cement, the cement is allowed to thoroughly dry.

The next step in the practice of the tire retreading system 10 is the application of the initially uncured cushion gum rubber strip 16 to the circumference of the tire body 14. This may be accomplished either by wrapping the rubber strip 16 around the circumference of the tire body 14 or by applying the rubber strip 16 to the interior surface of the tread strip 12. In either case, the initially uncured cushion gum rubber strip 16 must be wide enough to completely cover the entire buffed surface of the tire and must be carefully stitched to prevent trapping air between the rubber strip 16 and the buffed circumference of the tire body 14. The stitching operation is carried out by applying pressure rollers to the surface in order to expel any trapped air from between the initially uncured cushion gum rubber strip 16 and the circumference of the tire body 14.

After the strip of uncured cushion gum rubber 16 is applied, the premolded, precured tread strip 12 is mounted on the tire body 14. This is accomplished by wrapping the strip 12 around the circumference of the tire body 14 and the rubber strip 16 mounted thereon. Alternatively, the rubber strip 16 may be applied to the interior of the tread strip 12, in which event the strips 12 and 16 are simultaneously wrapped around the circumference of the tire body 14. In either event, care must be taken to properly center and align the tread strip 12 relative to the tire body 14.

A number of considerations are applicable to the splice between the opposite ends of the tread strip 12. The tread strip 12 may be cut to length either prior to or after mounted on the tire body. It is important that both ends of the tread strip are cut straight and square in order to produce a sound splice. Care must be taken to ensure that all exposed surfaces are kept free from contamination. The opposite ends of the tread strip 12 are thoroughly buffed. Care must be taken so that the bonding surfaces are not scorched. Cement is applied to both ends of the tread strip 12 and is allowed to completely dry. A piece of uncured cushion gum rubber is then applied to one end of the tread strip 12 with care being taken to cover the entire buffed area thereof. Finally, the opposite ends of the tread strip 12 are butted together in the manner illustrated in FIG. 2, and a strip of uncured cushion gum rubber 18 or other material is applied over the opposite ends 20 and 22 of the tread strip 12 and the piece of initially uncured cushion gum rubber 24 positioned therebetween in order to effect a seal during subsequent curing operations.

The premolded, precured tread strip 12 is then stitched down. This is accomplished by applying pressure rolls to the exterior of the tread strip 12 in order to expel any trapped air from between the tread strip 12 and the initially uncured cushion gum rubber strip 16, and from between the strip 16 and the circumference of the tire body 14. Following the stitching operation, the splice between the opposite ends of the tread strip 12 is inspected, and any voids are filled with uncured cushion gum rubber. Additional stitching operations may be required in order to assure a good splice. As a precautionary measure, the splice may be stapled.

After the premolded, precured tread strip 12 is in place and thoroughly stitched down, rigid strips 26 are positioned around the periphery of the tread strip 12 along the outer edges thereof. The rigid strips 26 comprise elongate, flexible members which are substantially non-extendable lengthwise thereof. In the embodiment of the invention illustrated in FIG. 1, the rigid strips 26 comprise separate members and are equipped with buckles 28, whereby the strips may be tightened around the periphery of the mounted tread strip 12. The rigid strips 26 may be formed from natural or synthetic belting meltings, natural or synthetic webbing materials, solid or stranded metal materials, or from other materials in accordance with particular requirements.

Figure 3:
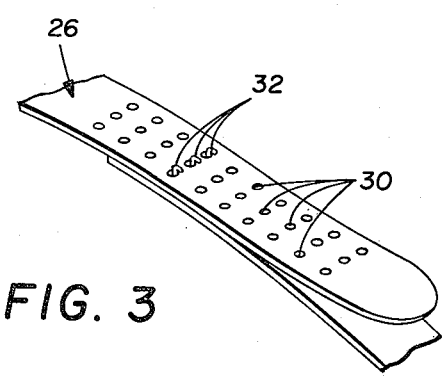
FIG. 3 is an illustrative of a second embodiment of the invention.
Figure 4:
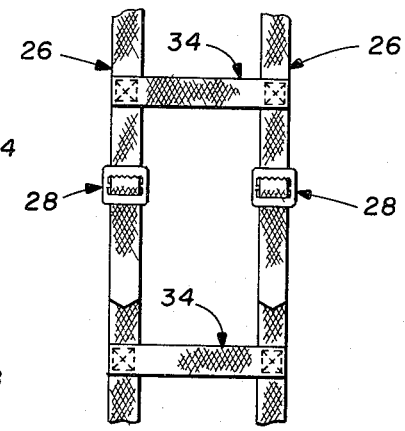
FIG. 4 is an illustration of a third embodiment.
Figure 5:
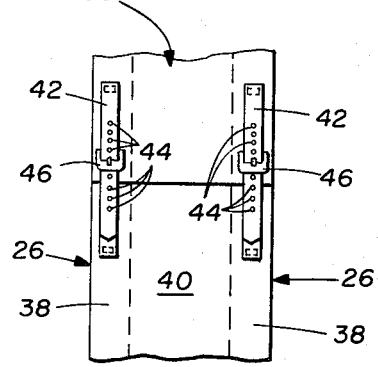
FIG. 5 is an illustration of a fourth embodiment.

FIG. 3 illustrates a second embodiment of the invention wherein one end of each rigid strip 26 is provided with apertures 30 and the opposite end of the strip 26 is provided with hooks 32 which cooperate with the apertures 30 to tighten the strip 26 around the periphery of the mounted tread strip 12. Referring to FIG. 4, a third embodiment of the invention comprises straps 34 which interconnect the rigid strips 26 to provide a one-piece construction. In FIG. 5 there is shown a fourth embodiment of the invention comprising a one-piece belt 36. The rigid strips 26 comprise reinforced outer portions 38 of the belt 36 with the center portion 40 comprising a relatively flexible portion. One end of the belt 36 is provided with straps 42 having apertures 44 formed therein, and the opposite end of the belt is provided with buckles 46 whereby the belt 36 may be tightened around the periphery of the mounted tread strip 12.

Referring again to FIG. 1, a heat resistant inner tube 50 is mounted within the tire body 14 either prior to or following the positioning of the rigid strips 26 around the periphery of the tread strip 12 along the outer edges thereof. Following the installation of the heat resistant inner tube 50, a road rim 52 is mounted on the tire body 14. The inner tube 50 is then inflated, whereby the exterior diameter of the mounted tread strip 12 is substantially increased. Since the strips 26 are non-extendable with respect to length, the interior diameter of the strips 26 is fixed. Therefore, upon inflation of the inner tube 50, the rigid strips 26 function to apply an inwardly directed force around the entire periphery of the mounted tread strip 12 along the outer edges thereof in the manner illustrated by the arrows 54 in FIG. 1. By this means the rigid strips 26 function to seal the zone extending between the mounted tread strip 12 and the circumference of the tire body 14 having the initially uncured cushion gum rubber strip 16 or other adhesive material contained therein.

Figure 6:
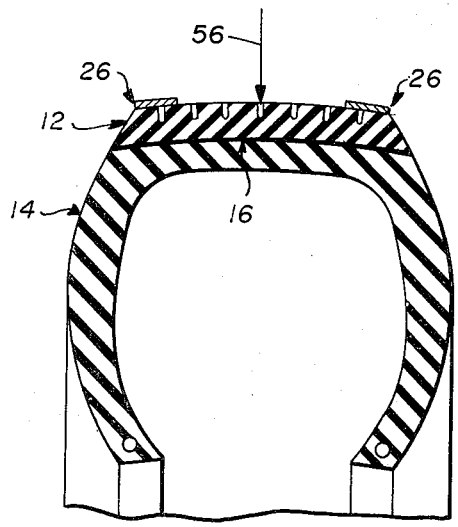
FIG. 6 is a sectional view illustrating a fifth embodiment.

The foregoing method of establishing a predetermined relationship between the exterior diameter of the mounted tread strip 12 and the interior diameters of the rigid strips 26 is applicable to the embodiments of the invention illustrated in FIGS. 1–5. In FIG. 6 there is shown a fifth embodiment of the invention which differs from the first four embodiments primarily with respect to the manner of establishing the predetermined relationship between the exterior diameter of the mounted tread strip and the interior diameters of the rigid strips 26.

In accordance with the fifth embodiment of the invention, the exterior diameter of the mounted tread strip 12 is initially reduced in the manner illustrated by the arrow 56. Commercially available apparatus may be utilized for this purpose. While the exterior diameter of the mounted tread strip 12 is reduced, rigid strips 26 are positioned around the periphery of the tread strip 12 along the outer edges thereof. The rigid strips 26 utilized in the fifth embodiment may be constructed as shown in FIGS. 2, 3, 4 or 5, if desired. Alternatively, the strips utilized in the fifth embodiment may comprise circular bands which are non-adjustable with respect to length. In either event, after the rigid strips 26 are positioned around the periphery of the mounted tread strip 12, the tread strip 12 is allowed to return to its original size to the extent permitted by the rigid strips 26, thereby establishing the predetermined relationship between the exterior diameter of the tread strip 12 and the interior diameters of the rigid strips 26. By this means the rigid strips 26 function to seal the zone extending between the mounted tread strip 12 and the circumference of the tire body 14 having the initially uncured gum rubber strips 16 or other adhesive material contained therein.

Referring again to FIG. 1, the next step in the operation of the tire retreading system 10 involves positioning the tire assembly comprising the tire body 14, the premolded, precured tread strip 12 and the initially uncured cushion gum rubber strip 16 extending therebetween in a matrix or chamber 60 with the rigid strips 26 in place on the periphery of the tread strip 12. The matrix 60 comprises two halves 62 and 64 having a pressure seal 66 extending therebetween. Each matrix half is provided with a steam coil 67 for preheating the matrix. The matrix half 64 includes a steam inlet 68, and the matrix half 62 includes a steam outlet 70 for vertical curing and a steam outlet 72 for horizontal curing. After the tire assembly is positioned in the matrix 60, the matrix halves 62 and 64 are secured in place by a heavy duty lock ring 74.

The matrix 60 has heavy duty skirts 76 each having grooves 78 formed on the interior thereof. The grooves 78 engage the side walls of the tire body 14 to form a sealed zone extending around the circumference of the tire body 14, and the rubber strips 16 and the tread strip 12 mounted thereon. Those skilled in the art will appreciate the fact that the matrix 60 is generally annular in shape and generally U-shaped in cross-section, whereby the sealed zone encompasses the entire circumference of the tire body 14 and the strips 12 and 16 mounted thereon.

Those skilled in the art will appreciate the fact that in order to effectively seal the side walls of the tire body 14 against the skirts 76 of the matrix 60, the heat resistant inner tube 50 must be inflated. Typically, the inner tube 50 is inflated to between about 80 and about 90 psi. After the tire assembly is sealed within the matrix 60 a heated, pressurized fluid such as steam is admitted to the sealed zone through the inlet 68. The pressure of the heated, pressurized fluid is preferably less than the pressure within the inner tube 50. For example, the heated, pressurized fluid may comprise steam at a pressure of between about 45 and about 55 psi. The presence of the heated, pressurized fluid within the sealed zone causes the initially uncured cushion gum rubber strip 16 to cure, thereby bonding the premolded, precured tread strip 12 to the tire body 14.

During the curing operation, the rigid strips 26 mounted on the periphery of the mounted tread strip serve to seal the zone extending between the circumference of the tire body 14 and the tread strip 12 having the initially uncured cushion gum rubber strip 16 contained therein. By this means the heated, pressurized fluid is prevented from entering this zone, thereby assuring a uniform bond between the tire body 14 and the tread strip 12. Those skilled in the art will appreciate the fact that the zone between the tire body and the tread strip must be sealed during the curing operation in order to form a satisfactory retread. Otherwise, bubbles can occur under the tread strip 12 resulting in an entirely unsatisfactory retreaded tire.

Following the curing operation, the heated, pressurized fluid is exhausted from the matrix 60. The lock ring 74 is then removed, and the matrix halves 62 and 64 are separated. At this point, the retreaded tire is removed from the matrix 60. Subject only to a final inspection, particularly with respect to the splice areas, the retreaded tire is then ready to be placed on a vehicle and put into service.

A further understanding of the superior results achieved by means of the present invention may be had by means of the following example. Two identical tires were simultaneously retreaded in a dual chamber matrix. One of the tires was retreaded in accordance with the prior art method in which a rubber envelope is fitted over a tire body having a tread strip and an uncured cushion gum rubber strip mounted thereon. The other tire was retreaded in accordance with the present invention.

Following a 45 minute cure, the initially uncured cushion gum rubber strip of the tire retreaded in accordance with the prior art procedure had achieved an equivalent cure of 10.218. Moreover, the temperature at the tire body circumference or buff line of the tire retreaded by means of the prior art procedure had risen from a starting temperature of 122° after three minutes to a temperature of 260° at the conclusion of the curing operation.

Meanwhile, following an identical 45 minute cure, the initially uncured cushion gum rubber strip of the tire retreaded in accordance with the present invention had achieved an equivalent cure of 27.048. The temperature at the circumference of the tire body or buff line of the tire retreaded in accordance with the present invention had risen from a starting temperature of 150° after three minutes to a final temperature of 286°.

The foregoing results aptly demonstrate the superiority of the present tire retreading system over the prior art. A further understanding of the superior results achieved by means of the present invention will be appreciated by the fact that in accordance therewith, it is possible to achieve an equivalent cure of the initially uncured cushion gum rubber strip of 10.122 following a cure of only 30 minutes. Such a cure compares favorably with the cure obtained by means of the prior art system following a curing period of 45 minutes.

From the foregoing, it will be understood that the present invention comprises a tire retreading system incorporating numerous advantages over the prior art. Perhaps the most important advantage deriving from the use of the invention involves the fact that by means thereof it is possible to obtain a superior bond between a tire body and a premolded, precured tread strip in a shorter period of time. Another advantage involves the fact that by means of the present invention the difficult and time consuming step of fitting a rubber envelope over the tire assembly is completely eliminated. Still another advantage involves the fact that by eliminating the use of the rubber envelope in the curing operation, the problems of wear and damage to the rubber envelope which have characterized prior art retreading procedures are completely eliminated.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A process for retreading a tire with a premolded, precured tread strip including the steps of:
   establishing a thermally responsive adhesive layer around the circumference of a tire body;
   wrapping a premolded, precured tread strip around the circumference of the tire body over the adhesive layer thereon;
   removing air trapped between the tread strip and adhesive layer and the tire body and adhesive layer;
   applying an inwardly directed force along each outer edge of the mounted tread strip around the entire periphery thereof to generate a larger sealing force along each outer edge of the mounted tread strip around the entire periphery thereof than intermediate of the outer edges of the tread strip for forming a sealed zone between the tread strip and the tire body having the thermally responsive layer contained therein;
   positioning the tire body - adhesive layer - tread strip assembly in a chamber having a generally annular shape and a generally U-shaped cross-section;
   forming a seal between the chamber and the side walls of the tire body and thereby forming a sealed zone surrounding the entire circumference of the tire body, the entire premolded, precured tread strip and the adhesive layer therebetween;
   admitting heated, pressurized fluid to the sealed zone and thereby actuating the adhesive layer to form a bond between the tire body and the premolded, precured tread strip;
   said inwardly directed forces preventing the heated and pressurized fluid from entering the zone between the tire body and the tread strip and thereby assuring a uniform bond therebetween.

2. The retreading process according to claim 1 wherein the step of applying an inwardly directed force along each outer edge of the mounted tread strip is carried out by:
   positioning substantially rigid strips around the circumference of the mounted tread strip along the outer edges thereof; and
   establishing a fluid tight relationship between the exterior diameter of the mounted tread strip and the interior diameters of the rigid strips such that the rigid strips form a sealed zone between the tread strip and the tire body having the thermally responsive adhesive layer contained therein.

3. The retreading process according to claim 2 wherein the step of establishing a fluid tight relationship between the exterior diameter of the tread strip and the interior diameters of the rigid strips is carried out by:
   tightening the rigid strips around the exterior periphery of the tread strip along the outer edges thereof; and
   subsequently pressurizing the interior of the tire body and thereby establishing the fluid tight relationship between the exterior diameter of the tread strip and the interior diameters of the rigid strips.

4. The retreading process according to claim 2 wherein the step of establishing a fluid tight relationship between the exterior diameter of the tread strip and the interior diameters of the rigid strips is further characterized by:
   temporarily reducing the exterior diameter of the tread strip;
   positioning the rigid strips around the exterior periphery of the tread strip along the outer edges thereof; and allowing the tread strip to return to its original size to the extent permitted by the rigid strips and thereby establishing the fluid tight relationship between the exterior diameter of the tread strip and the interior diameters of the rigid strips.

5. The retreading process according to claim 1 wherein the step of providing heated, pressurized fluid within the sealed zone is further characterized by simultaneously pressurizing the interior of the tire body, said pressure within the tire body exceeding the pressure within the sealed zone.

6. The retreading process according to claim 1 further characterized by the prior step of buffing the tire body to provide a circumference having a predetermined radius.

7. The retreading process according to claim 1 wherein the adhesive layer establishing step is carried out by wrapping the circumference of the tire body with a strip of uncured cushion gum rubber.

8. A process for retreading a tire body with a premolded, precured tread strip including the steps of:

buffing a tire body to provide a circumference having a predetermined radius;

establishing a layer of thermally responsive adhesive material around the circumference of the buffed tire body;

wrapping a premolded, precured tread strip around the circumference of the tire body over the adhesive layer thereon;

positioning rigid strips around the exterior of the mounted tread strip along the outer edges thereof to generate a larger sealing force along each outer edge of the tread strip around the entire periphery thereof than intermediate of the outer edges of the tread strip;

establishing a fluid tight relationship between the exterior diameter of the tread strip and the interior diameters of the rigid strips so that each outer edge of the tread strip is pressed firmly into engagement with the tire body and thereby sealing the zone between the tread strip and the tire body having the thermally responsive adhesive material contained therein;

positioning the tire body - adhesive material - tread strip assembly with the rigid strips mounted thereon in a generally annularly shaped chamber having a generally U-shaped cross-section;

forming a seal between the side walls of the tire body and the chamber and thereby forming a sealed zone encompassing the entire circumference of the tire body and the adhesive layer and the tread strip mounted thereon;

admitting a heated, pressurized fluid to the sealed zone and thereby actuating the adhesive layer to bond the tread strip to the tire body;

said rigid strips functioning to prevent the heated, pressurized fluid from entering the sealed zone between the tire body and the tread strip and thereby assuring a uniform bond therebetween.

9. The retreading process according to claim 8 wherein the adhesive layer establishing step is carried out by wrapping a strip of uncured cushion gum rubber having a predetermined width around the entire circumference of the buffed tire body.

10. The retreading process according to claim 8 further including the step of covering the joint between the ends of the premolded, precured rubber tread strip prior to the step of providing heated, pressurized fluid in the sealed zone.

11. The retreading process according to claim 8 further characterized by pressurizing the interior of the tire body simultaneously with the step of admitting a heated, pressurized fluid to the sealed zone, said pressure within the tire body being greater than the pressure within the sealed zone.

12. The retreading process according to claim 8 wherein the step of establishing a fluid tight relationship between the exterior diameter of the tread strip and the interior diameters of the rigid strips is carried out by:

tightening the rigid strips around the periphery of the tread strip along the outer edges thereof while the interior of the tire body is unpressurized; and subsequently pressurizing the interior of the tire body to expand the exterior diameter of the tread strip and thereby establish the fluid tight relationship between the outer diameter of the tread strip and the inner diameters of the rigid strips.

13. The retreading process according to claim 8 wherein the step of establishing the fluid tight relationship between the exterior diameter of the tread strip and the interior diameters of the rigid strips is carried out by:

temporarily reducing the exterior diameter of the tread strip;

positioning the rigid strips around the outer edges of the periphery of the tread strip while the exterior diameter thereof is temporarily reduced; and subsequently allowing the tread strip to return to its original diameter to the extent permitted by the rigid strips and thereby establishing the fluid tight relationship between the exterior diameter of the tread strip and the interior diameters of the rigid strips.

14. An apparatus for retreading a tire body with a premolded, precured tread strip by means of an adhesive layer extending therebetween which comprises:

means for applying an inwardly directed force along each outer edge of the mounted tread strip around the entire periphery thereof and thereby sealing the zone between the tread strip and the tire body having the adhesive layer contained therein;

chamber means having a generally annular shape and a generally U-shaped cross-section for receiving the tire body - adhesive layer - tread strip assembly with the force applying means mounted thereon;

said chamber means including means for cooperation with the side walls of the tire body to form a sealed zone extending entirely around the circumference of the tire body and the tread strip mounted thereon;

means for admitting a heated, pressurized fluid to the sealed zone and thereby activating the adhesive layer to bond tread strips to the body;

said force applying means preventing the heated, pressurized fluid from entering the zone between the tread strip and the tire body during the curing process and thereby assuring a uniform bond between the tire body and the tread strip.

15. The tire retreading apparatus according to claim 14 wherein the force applying means comprises:

rigid strip means extending around the periphery of the mounted tread strip along the outer edges thereof; and means for establishing a fluid tight relationship between the exterior diameter of the mounted tread strip and the interior diameters of the rigid strips and thereby sealing the zone between the tread strip and the tire body having the adhesive layer contained therein.

16. The retreading apparatus according to claim 15 wherein the means for establishing a fluid tight relationship between the exterior diameter of the mounted tread strip and the interior diameters of the rigid strip means comprises:
 means for tightening the rigid strip means around the periphery of the mounted tread strip along the outer edges thereof; and
 means for thereafter pressurizing the interior of the tire body.

17. The retreading apparatus according to claim 15 wherein the means for establishing a fluid tight relationship between the exterior diameter of the mounted tread strip and the interior diameters of the rigid strip means includes means for temporarily reducing the exterior diameter of the mounted tread strip, and wherein the interior diameters of the rigid strip means are less than the normal exterior diameter of the mounted tread strip.

18. The retreading apparatus according to claim 15 wherein the rigid strip means comprise:
 elongate, flexible members which are substantially non-extendable with respect to length; and
 fastener means for securing the elongate flexible members around the periphery of the mounted tread strip.

19. The tire retreading apparatus according to claim 14 further characterized by:
 means for pressurizing the interior of the tire body during the curing step with the pressure within the tire body exceeding the pressure within the sealed zone extending around the circumference of the tire body and the premolded, precured tread strip mounted thereon.

20. An apparatus for retreading tires with a premolded, precured tread strip by means of a strip of uncured cushion gum rubber extending between the tire body and the tread strip which comprises:
 rigid strip means extending around the periphery of the mounted tread strip along the outer edges thereof;
 means for establishing a fluid tight relationship between the exterior diameter of the mounted tread strip and the interior diameters of the rigid strip means and thereby sealing the zone extending between the tread strip and the tire body having the uncured cushion gum rubber strip contained therein;
 a multi-part chamber for receiving the tire body - uncured rubber strip - tread strip assembly with the rigid strip means mounted thereon;
 said chamber including sealing means for cooperation with the side walls of the tire to form a sealed zone extending entirely around the circumference of the tire body and the tread strip mounted thereon;
 means for directing a heated, pressurized fluid into the sealed zone extending around the circumference of the tire body and the tread strip mounted thereon and thereby curing the previously uncured rubber strip to bond the tread strip to the tire body;
 said rigid strip means preventing the heated, pressurized fluid from entering the zone between the tread strip and the tire body during the curing process and thereby assuring a uniform bond between the tread strip and the tire body; and
 means for pressurizing the interior of the tire body during the curing step with the pressure inside the tire body exceeding the pressure inside the sealed chamber.

21. The retreading apparatus according to claim 20 wherein the means for pressurizing the interior of the tire during the curing step comprises an inner tube contained within the tire body and a rim receiving the tire body with the inner tube contained therein.

22. The retreading apparatus according to claim 20 wherein the means for establishing a fluid tight relationship between the exterior diameter of the mounted tread strip and the interior diameters of the rigid strip means comprises:
 means for tightening the rigid strip means around the exterior periphery of the tread strip; and
 means for subsequently pressurizing the interior of the tire body.

23. The retreading apparatus according to claim 20 further characterized by means for sealing the multi-part chamber with the tire body - uncured rubber strip - tread strip assembly having the rigid strip means mounted thereon contained therein and thereby engaging the sealing means of the chamber with the side walls of the tire body.

24. In a tire retreading apparatus of the type in which a strip of uncured cushion gum rubber and a premolded, precured tread strip are mounted on the circumference of a buffed tire body and the tire body - uncured rubber strip — tread strip assembly is thereafter subjected to heated, pressurized fluid in a sealed chamber to cure the rubber strip and thereby bond the tread strip to the tire body, the improvement comprising:
 rigid strip means extending around the periphery of the mounted tread strip along the outer edges thereof; and
 means for establishing a fluid tight relationship between the exterior diameter of the mounted tread strip and the interior diameters of the rigid strip means so that the rigid strip means functions to seal the zone between the tread strip and the tire body having the rubber strip contained therein and thereby assure the formation of a uniform bond between the tire body and the tread strip.

25. The improvement according to claim 24 wherein the rigid strip means provides elongate, flexible members which are substantially non-extendable lengthwise thereof.

26. The improvement according to claim 25 wherein the rigid strip means further includes fastener means for tightening the elongate, flexible members around the periphery of the mounted tread strip.

27. The improvement according to claim 24 further characterized by means connecting the elongate, flexible members one to the other to provide an assembly having an overall width substantially equal to that of the tread strip.

* * * * *